US005806312A

United States Patent [19]

Kauss et al.

[11] Patent Number: 5,806,312

[45] Date of Patent: Sep. 15, 1998

[54] MULTIPLE HYDRAULIC DISTRIBUTOR DEVICE

[75] Inventors: Wolfgang Kauss, Sainte-Foy-les-Lyon; Emmanuel Rémi Jean-Marie Richer, Bourgoin Jallieu, both of France

[73] Assignee: Mannesmann Rexroth S.A., France

[21] Appl. No.: 796,589

[22] Filed: Feb. 6, 1997

[30] Foreign Application Priority Data

Feb. 7, 1996 [FR] France .................................. 96 01499

[51] Int. Cl.[6] ...................................................... F16D 31/02

[52] U.S. Cl. ................................ 60/445; 60/420; 60/422; 60/426; 60/452; 137/596

[58] Field of Search ............................. 60/422, 426, 427, 60/452, 420; 137/596

[56] References Cited

U.S. PATENT DOCUMENTS

| | | | |
|---|---|---|---|
| 4,116,001 | 9/1978 | Orth | 60/420 |
| 4,787,294 | 11/1988 | Bowden | 91/447 |
| 4,850,191 | 7/1989 | Kreth et al. | 60/422 |
| 5,138,837 | 8/1992 | Obertrifter | 60/426 |
| 5,305,789 | 4/1994 | Revolier | 137/596 |
| 5,699,665 | 12/1997 | Coolidge | 60/426 |

FOREIGN PATENT DOCUMENTS

| | | |
|---|---|---|
| A-0 563 514 | 6/1993 | European Pat. Off. . |
| A-2 609119 | 7/1988 | France . |
| A-33 09 996 | 9/1984 | Germany . |
| A-40 05 967 | 8/1991 | Germany . |
| A-81 01316 | 5/1981 | WIPO . |

*Primary Examiner*—Thomas E. Denion
*Assistant Examiner*—Bijan N. Karimi
*Attorney, Agent, or Firm*—Henderson & Strum

[57] ABSTRACT

A multiple hydraulic distributor device, having an antisaturation function wherein flow of hydraulic fluid is divided independently of load, which includes a hydraulic distributor device having a number of distributor devices assigned to controlling respective loads, which are stacked up face to face against each other as a stack and individually arranged in such a way that the stack has a common line passing through the stack for supplying working fluid under pressure originating from a source including a pump associated with a flow/pressure control device, a common return line for returning working fluid to a tank, and a common transmission line for transmitting control fluid at a pressure of highest load towards the control device for controlling the pump; a shut-off device arranged in the transmission line between a first group of distributors for which the transmission line is connected to the flow/pressure control device for controlling the source, and at least a second group of distributors for which the transmission line is not connected to the flow/pressure control device for controlling the source, wherein the second group of distributor devices are not subjected to a pressure of the first group of distributors and respective corresponding receivers are free to receive output flow from the source, wherein the pressure in these receivers is selected from the group consisting of pressure of the load and pressure corresponding to flow determined by the pressure flow equilibrium.

4 Claims, 3 Drawing Sheets

MULTIPLE HYDRAULIC DISTRIBUTOR DEVICE

The present invention relates to improvements made to multiple hydraulic distributor devices with antisaturation function and with the flow being divided independently of the load, including a number of distributor means assigned to controlling respective loads and stacked up face to face against each other, these distributor means being individually arranged in such a way that the stack has passing right through it a common line for supplying working fluid under pressure originating from a source comprising a pump associated with a flow/pressure control device ("load-sensing" or LS control), a common line for returning the working fluid to a tank, and a common line for transmitting control fluid at the pressure of the highest load towards the abovementioned device for controlling the pump.

A multiple hydraulic distributor device provided with an anti-saturation function and with the flow being divided independently of the load shares out the available pump delivery strictly according to the proportionate needs of the loads respectively controlled, this division or sharing-out of the flow ensuring that the highest pressure required by one of the loads (pressure LS) is effectively transmitted to the line LS and to the device for controlling the pump.

A machine which operates on hydraulics and is controlled by such a device capable of distributing working fluid at the pressure required by the loaded receiver is therefore capable of developing a greater tearing force when there is a combination of simultaneous displacements of several receivers (for example, in a hydraulic excavator, up to four hydraulic receivers—bucket and arms—can be activated simultaneously during a digging operation).

This significant advantage is, however, accompanied by a drawback which makes itself felt when the distributor device is fed by a variable-capacity pump provided with a device for controlling the power. With such a pump arrangement, the curve representing the variation in delivery (along the X-axis) as a function of pressure (on the Y-axis) is a portion of a hyperbola and the point which represents maximum power moves along this portion of a hyperbola. For a given output power, this type of pump is capable of a delivery or of a pressure higher respectively than those which can be supplied by a pump of the same power but not equipped with this type of control system.

In cases where the distributor device transmits the maximum LS pressure signal to the pump equipped with a power controller, for example when one receiver reaches the end of its travel, the pump is controlled on the basis of this maximum pressure and of the hyperbolic power curve, and it therefore provides a smaller delivery.

The result of this is that the machine controlled by the distributor device becomes slower, even though the receiver which has reached the end of its travel does not require any flow. For example, in the case already envisaged above in which the machine thus controlled is an excavator, the translational movement of the machine on its caterpillar tracks is slowed abruptly at the moment when one of the hydraulic receivers which is controlled at the same time (bucket for example) reaches the end of its travel.

This is a real drawback because there may be no reason, even one of safety, to justify the slowing of one of the functions when another function has reached the end of its travel. The case is quite the opposite; the abrupt slowing mentioned hereinabove may lead to an accident.

The object of the invention is essentially to overcome this drawback and to propose a solution which, while retaining, for controlling some of the receivers, the essential advantage afforded by the controlling of the pump in combination with the multiple hydraulic distributor device provided with an anti-saturation function and with the flow being divided independently of the load, nonetheless makes it possible to avoid the impact that this control has on the control of some of the other receivers, which have to be able to continue to operate without appreciable disruption.

To this end, a multiple hydraulic distributor device as mentioned in the preamble is essentially characterized, while being arranged in accordance with the invention, in that a shut-off means is arranged in the line LS between a first group of distributor means for which the line LS is connected in a way known per se to the device for controlling the source and at least one second group of distributor means for which the line LS is not connected to the device for controlling the source, by virtue of which the distributor means of the said second group of distributor means are not subjected to the pressure LS of the first group of distributor means and the respective corresponding receivers are free to receive the output flow from the source, the pressure in these receivers therefore being either the pressure of the load or the pressure corresponding to the flow determined by the pressure/flow equilibrium.

In a preferred embodiment, the line LS of the second group of distributor means is connected to the device for controlling the source through a preloaded non-return member, and then advantageously, for there to be produced a compact device requiring no external connections, the preloaded non-return member is arranged in the common line LS and constitutes the abovementioned shut-off means separating the first group and the second group of distributor means.

By virtue of this arrangement, each distributor means is able to split the flow or not depending on which group of distributor means is delivering the pressure LS. The function of the multiple distributor device thus proves to be particularly attractive because, depending on which group of distributor means is supplying the pressure information LS, each distributor means splits the flow perfectly or to suit. If the end group of the multiple distributor device, which may or may not be isolated from the rest of the line LS by the non-return member, is generating the highest pressure signal, then the distributor device splits the flow in proportion with the demand because the pressure LS is free to flow through the entire line LS, passing through the non-return member. If on the other hand this end group of the multiple distributor device is connected to the least heavily loaded receivers, the highest pressure in the neighbouring group is not transmitted to it because the non-return member remains closed: the ensuing flow is at minimum that which the pump can provide under the pressure of the load of the isolated end group.

It will be noted that each group of distributor means of the distributor device, which may or may not be isolated from the line LS by the closing of the non-return shut-off member, works by splitting the available flow between its own distributor means. This splitting is to receivers capable of moving, at the pressure prevailing in the system.

The invention will be better understood from reading the detailed description which follows of some embodiments which are given purely by way of non-limiting examples. In this description, reference is made to the appended drawings in which.

Figure 1:
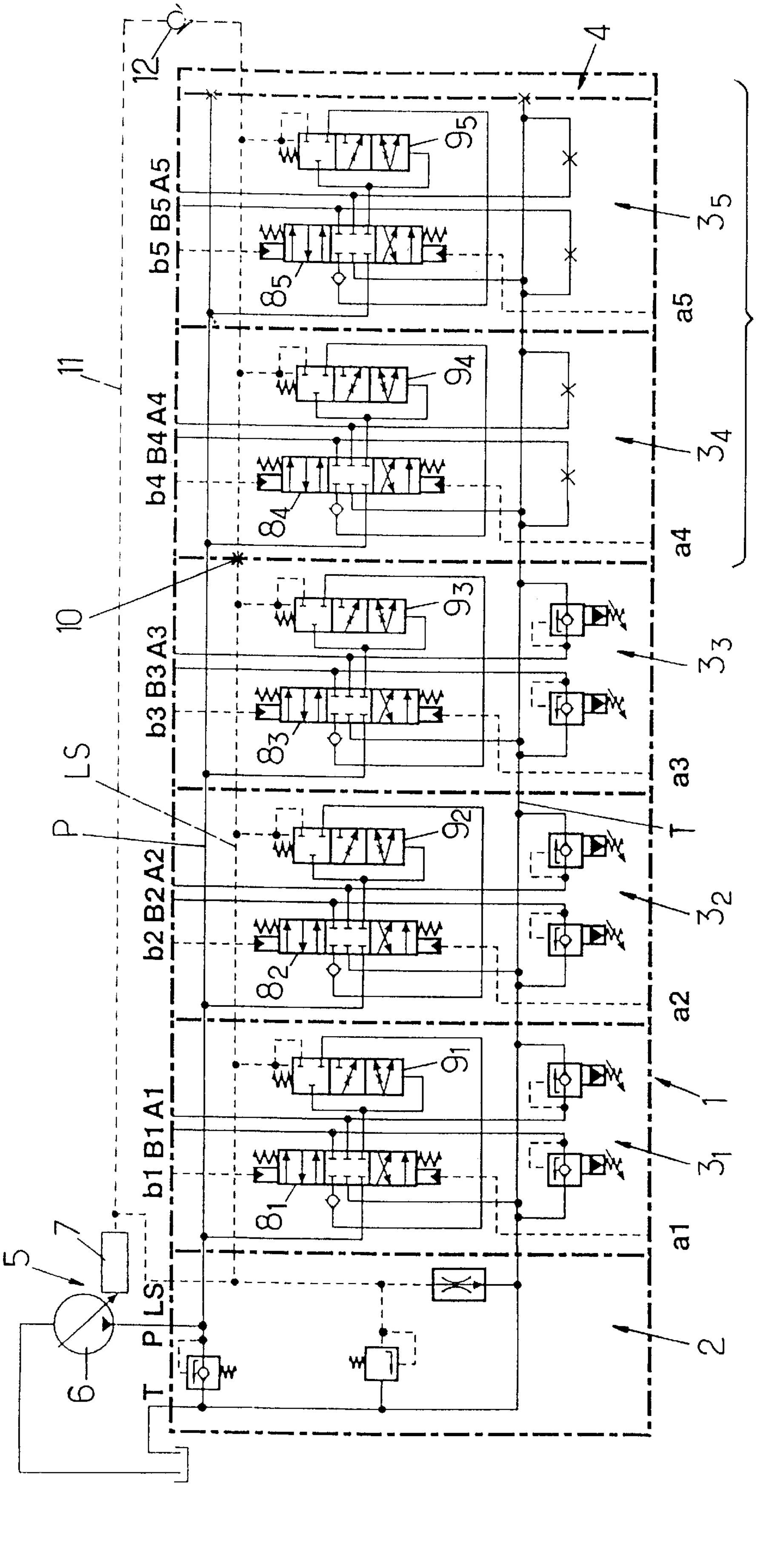
FIG. 1 is a hydraulic circuit diagram showing a multiple distributor device in a preferred basic layout according to the invention.

Referring first of all to FIG. 1, a multiple distributor device denoted overall by the numerical reference 1 comprises an inlet stage 2 and several distributor stages 3 (here five stages denoted respectively by $\mathbf{3}_1$ to $\mathbf{3}_5$). In a conventional way, the distributor device 1 consists of a leaktight face-to-face stack of six blocks respectively constituting the inlet stage 2 and the five distributor stages 3. Each block is configured in such a way as to have passing right through it three pipes, namely a pipe for supplying working fluid under pressure (pipe P), a pipe for returning the working fluid (pipe T) and a pipe for control fluid at the highest load pressure (pipe LS). The blocks 2 and $\mathbf{3}_1$ to $\mathbf{3}_5$ being stacked one after another, the various pipes follow on from one another and form three continuous lines for the circulation of fluid (a line P, a line T and a line LS) passing right through the whole device 1. At its free end, following the last distributor block $\mathbf{3}_5$, a blanking block 4 shuts off the three lines P, T and LS in a leaktight way.

The inlet block 2 includes an inlet port P allowing the line P to be connected to the outlet of a source 5 of fluid under pressure and an outlet port T allowing the line T to be connected to a tank. The source 5 consists of a pump 6 with which is associated a control device 7 governed by the pressure LS (for example, as represented, a variable-capacity pump equipped with a power controller governed by the pressure LS): the inlet block 2 is provided with an outlet port LS connected to the inlet of the control device 7.

Each distributor block is constructed in the same way. For example, the block $\mathbf{3}_1$ comprises a three-way, three-position distributor $\mathbf{8}_1$ (shown in the neutral position) which is connected, on the one hand, to the lines P and T and, on the other hand, to two working ports $A_1$ and $B_1$, which are themselves connected to a receiver, not represented. The two controls for displacing the slide valve of the distributor $\mathbf{8}_1$ are connected to two respective ports $a_1$ and $b_1$, which are themselves connected to a control manipulator, not represented.

The distributor $\mathbf{8}_1$ is furthermore of the type which divides the flow independently of the load and distributes the flow in strict proportion with the opening of the slide valve, according to a configuration which is known in the art.

Furthermore, a two-way, three-position balance $\mathbf{9}_1$ receives the working fluid pressure (through the third path of the distributor $\mathbf{8}_1$) and the pressure in the line LS so that it is subjected to the difference between the pressure in the line LS, on the one hand, and the working pressure, on the other hand, and so that it establishes a link with the line LS in the case where the working pressure of the distributor $\mathbf{8}_1$ becomes higher than the pressure in the line LS. The set of balances $\mathbf{9}_i$ in all of the distributor blocks $\mathbf{3}_i$ allows the flow provided by the pump to be controlled as a function of the need of the most highly loaded receiver.

In the conventional configuration of the multiple distributor device 1, the line LS extends through the entire device and is common to all of the individual distributor blocks $\mathbf{3}_1$ to $\mathbf{3}_5$. However, this architecture results in the drawback of an abrupt reduction in flow in all of the distributors when one receiver reaches the end of its travel, with the detrimental consequences which stem therefrom, as explained hereinabove at the beginning of the description.

The arrangement in accordance with the invention consists in breaking the continuity of the line LS at an appropriate place so as to isolate one or more distributor blocks from other distributor blocks. Thus in the example considered in FIG. 1, with the desire to isolate the last two distributor blocks $\mathbf{3}_4$ and $\mathbf{3}_5$, the line LS is shut off for example with the aid of a shut-off member 10 arranged where the respective pipes LS of the blocks $\mathbf{3}_3$ and $\mathbf{3}_4$ meet.

Thanks to this arrangement, the distributors of the non-isolated group $\mathbf{3}_1$ and $\mathbf{3}_3$ remain connected to the pump controller in the conventional way and the LS function is therefore provided in the usual way for these three blocks alone. In contrast, the distributors of the isolated group $\mathbf{3}_4$ and $\mathbf{3}_5$ are no longer included in a control system of the LS type: the corresponding receivers are free to receive the output flow delivered by the source 5, the working pressure in these receivers therefore being either the pressure of the load or the pressure corresponding to the flow determined by the pressure/flow equilibrium.

However, the fact that the distributors of the isolated group $\mathbf{3}_4$ and $\mathbf{3}_5$ are no longer included in a system with an LS function is a functional handicap which is not permissible in practice. To avoid this drawback, provision is made for the isolated portion of the line LS of the blocks $\mathbf{3}_4$ and $\mathbf{3}_5$ which is isolated from the rest of the line LS by the shut-off member 10 then to be connected, for example by an external pipe 11 to the inlet of the device 7 for controlling the pump via a preloaded non-return member 12.

The presence of the feedback line 11 incorporating a preloaded non-return member 12 allows a complete or partial LS function to be assured: when it is one of the distributors of the isolated group $\mathbf{3}_4$ or $\mathbf{3}_5$ which is generating the highest load pressure, then in this case, and in this case only, the pressure LS is common to the whole of the distributor device 1 and governs the pump 6 in the appropriate way. Otherwise, if it is the first group of the blocks $\mathbf{3}_1$ to $\mathbf{3}_3$ which is generating the highest load pressure, then only the first group is subjected to control of the LS type.

By way of a concrete example, the two distributors of the isolated group $\mathbf{3}_4$ and $\mathbf{3}_5$ control the two caterpillar tracks, respectively, providing for the translational movement of an excavator, while the other distributors of the non-isolated group $\mathbf{3}_1$ to $\mathbf{3}_3$ respectively control the arms and the bucket. By implementing the provisions of the invention, excessively abrupt interference of the operation of the arms and/or of the bucket on the translational function of the excavator is avoided.

Figure 2:
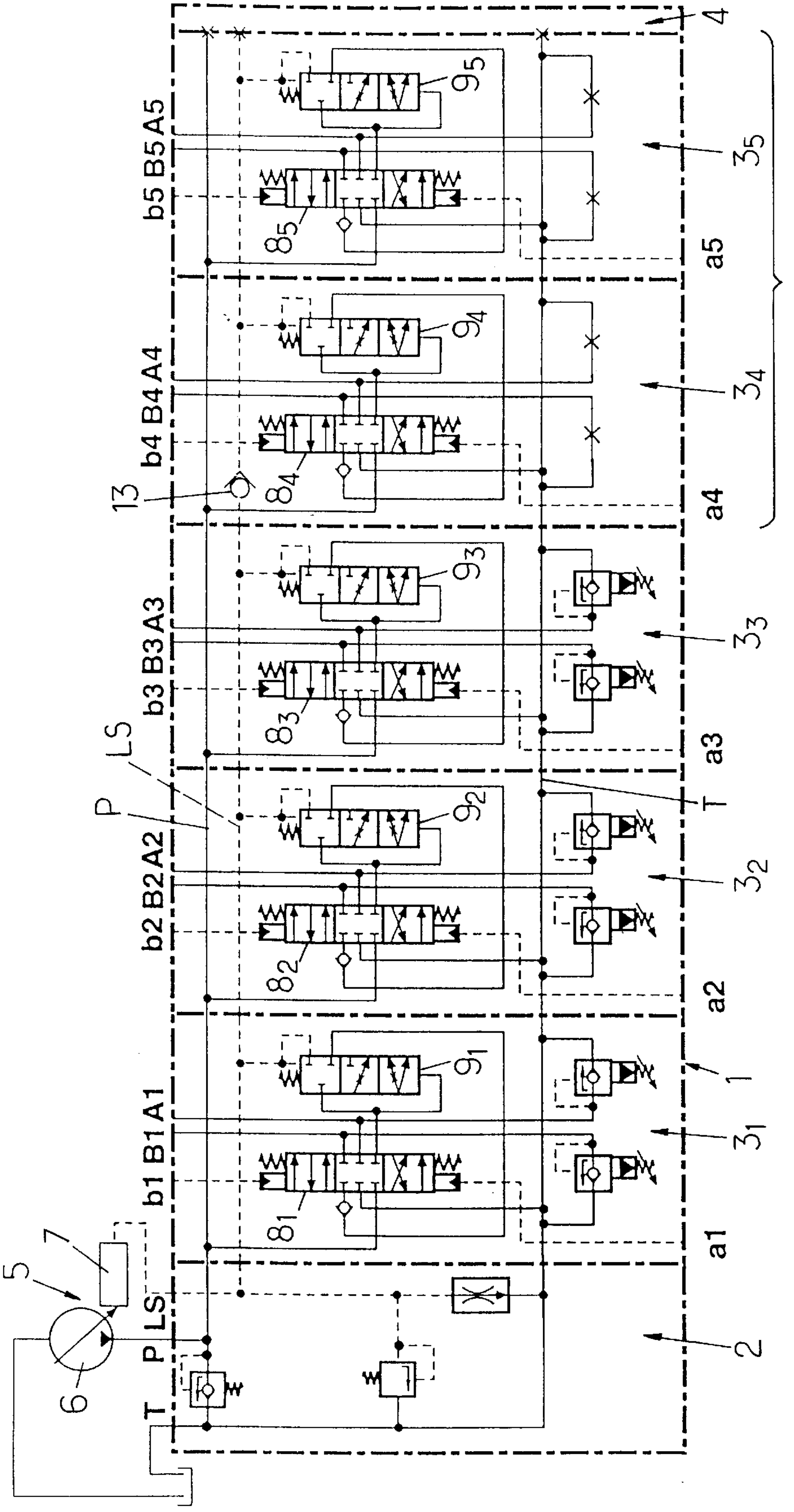
FIG. 2 is a diagram similar to that of FIG. 1, in which the multiple distributor device is arranged in a preferred practical way.

The diagram of FIG. 2 shows a preferred arrangement for a practical embodiment of the basic arrangement of FIG. 1. The device of FIG. 2 is constructed overall in a similar way to that of FIG. 1, and the same numerical references have been kept, the exception being that the shut-off member here consists of the preloaded non-return member itself denoted here as 13. Thus the shut-off function and the non-return function are combined into a single element, and the drawback presented by the external return line 11 is avoided while at the same time keeping the advantage of a multiple distributor device in the form of a block with no external wiring. Depending on which group is originating the highest pressure information, the flow is distributed perfectly or to suit; in particular, if the highest pressure is generated by one of the distributors of the isolated group $\mathbf{3}_4$ or $\mathbf{3}_5$, then the pressure in this part of the line LS opens the preloaded non-return member 13 and becomes established in the entire line LS of the distributor device 1 so as to govern the pump 6. If, by contrast, the pressure in the isolated part of the line LS remains lower than that prevailing in the non-isolated part of the line LS, then the LS function is provided merely by the distributors of the non-isolated group $\mathbf{3}_1$ to $\mathbf{3}_3$.

Figure 3:
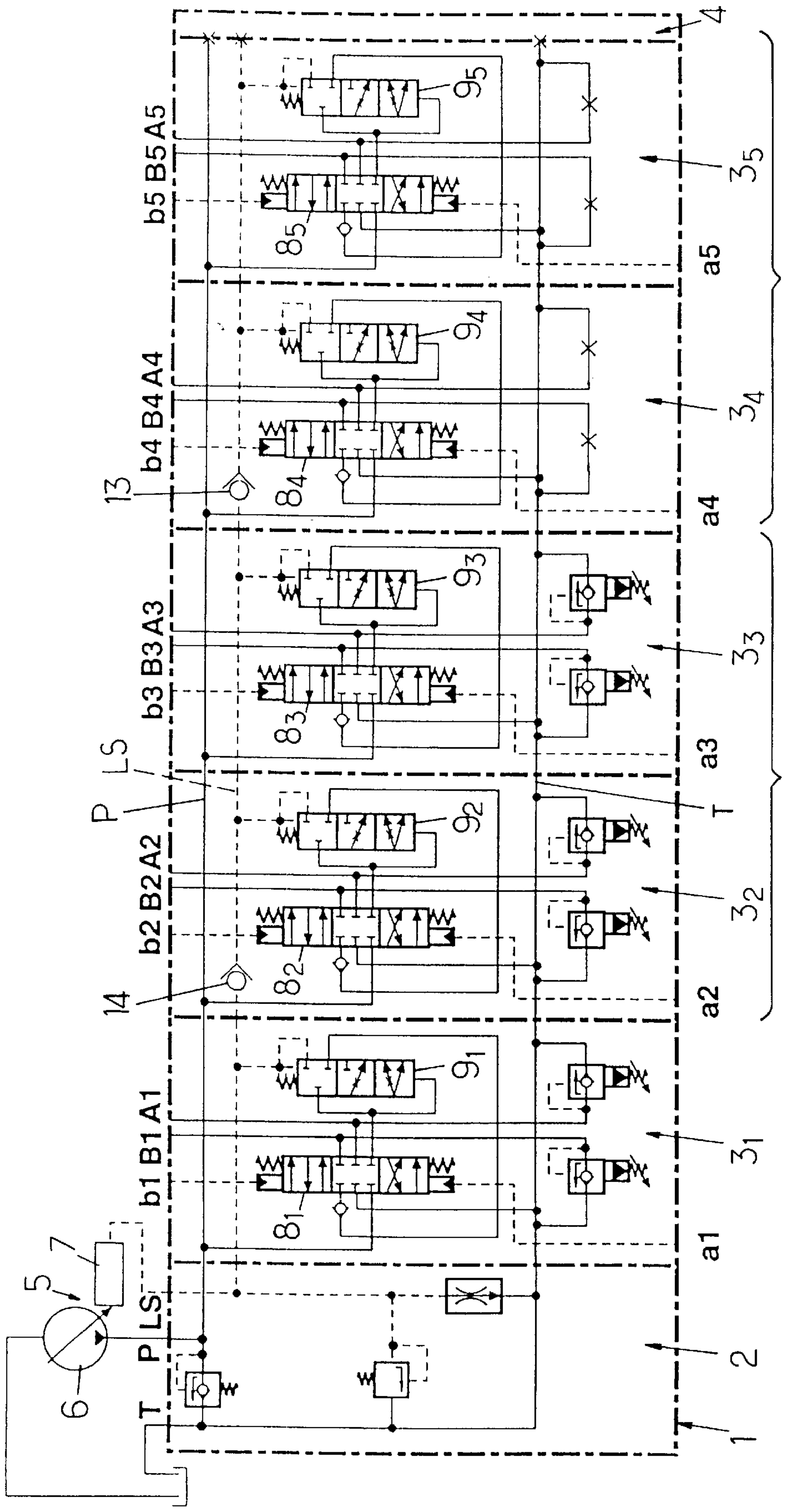
FIG. 3 is a diagram similar to that of FIG. 2 showing a subdivision of the distributor device which differs from the subdivision of FIG. 2.

Of course the provisions in accordance with the invention are not limited to isolating a single group of distributors, and it is possible to envisage a succession of groups of distributors which are isolated from one another cascade fashion by respective non-return members. Such an arrangement is represented in FIG. 3: the distributor device retains the same composition as in FIGS. 1 and 2, but the fitting of a second non-return member 14 in the line LS for example between the distributor blocks $\mathbf{3}_1$ and $\mathbf{3}_2$, allows three groups to be formed: the first group incorporates the block $\mathbf{3}_1$ alone (for example this is the control of just the bucket of the excavator), the distributor of which is therefore the only one permanently associated with the LS function, in order to afford safety when the bucket, as it frequently does, reaches the end of its travel during digging; the second group, isolated by the non-return member 14, incorporates the blocks $\mathbf{3}_2$ and $\mathbf{3}_3$ (for example controlling the arms of the excavator); the third group, isolated from the previous one by the non-return member 13, incorporates the blocks $\mathbf{3}_4$ and $\mathbf{3}_5$ (for example for controlling the caterpillar tracks).

Thus a hierarchic succession of control stages is formed. The blocks $\mathbf{3}_2$ and $\mathbf{3}_3$ are not influenced by the operation of the block $\mathbf{3}_1$, but they become involved in the process of controlling the pump as soon as one of them is delivering the highest pressure which then becomes LS pressure for the two groups ($\mathbf{3}_1$) and ($\mathbf{3}_2$, $\mathbf{3}_3$). Likewise the third group $\mathbf{3}_4$ and $\mathbf{3}_5$ remains independent of the operating of the stages $\mathbf{3}_1$ to $\mathbf{3}_3$ so long as the pressure LS controlling the pump is delivered by one of the stages $\mathbf{3}_1$ to $\mathbf{3}_3$, but they impose the pressure LS as soon as one of them has the highest load pressure of the whole.

Thus a multiple distributor device with very great operating flexibility is constructed, the structure of which remains substantially that of a similar distributor device of the prior art, and in which the technological arrangement in accordance with the invention (the housing of one or more non-return members) is easy and inexpensive to achieve.

As goes without saying and as is already obvious from the foregoing, the invention is not in any way limited to those of its methods of application and embodiments which have been more specifically envisaged; on the contrary, it encompasses all alternative forms thereof.

We claim:

1. A multiple hydraulic distributor device having an antisaturation function wherein flow of hydraulic fluid is divided independently of load, said hydraulic distributor device comprising a number of distributor means for controlling respective loads, said distributor means being stacked up face to face against each other as a stack, and individually arranged in such a way that the stack comprises a common line for supplying working fluid under pressure originating from a source comprising a pump associated with a flow/pressure control device for controlling the pump and at least one member selected from a group consisting of pressure flow of working fluid and flow of control fluid, a common return line for returning working fluid to a tank, and a common transmission line for transmitting control fluid at a pressure of highest load towards said control device for controlling the pump; a shut-off means arranged in the transmission line between a first group of distributor means for which the transmission line is connected to the flow/pressure control device for controlling the source and at least a second group of distributor means for which the transmission line is not connected to the flow/pressure control device for controlling the source, wherein said second group of distributor means are not subjected to a pressure of said first group of distributor means, and respective corresponding receivers are free to receive output flow from the source, the pressure in said receivers comprising one member selected from the group consisting of pressure of the load and pressure corresponding to flow determined by pressure flow equilibrium.

2. A multiple hydraulic distributor device according to claim 1, wherein the transmission line of the second group of distributor means is connected by a line to the flow/pressure control device for controlling the source through a preloaded non-return member.

3. A multiple hydraulic distributor device having an antisaturation function wherein flow of hydraulic fluid is divided independently of load, said hydraulic distributor device comprising a number of distributor means for controlling respective loads, said distributor means being stacked up face to face against each other as a stack, and individually arranged so that the stack of distributor means comprises a common line for supplying working fluid under pressure originating from a source comprising a pump associated with a flow/pressure control device, a common return line for returning working fluid to a tank, and a common transmission line for transmitting control fluid at a pressure of highest load towards said control device for controlling the pump; a shut-off means arranged in the transmission line between a first group of distributor means for which the transmission line is connected to the flow/pressure control device for controlling the source, and at least a second group of distributor means for which the transmission line is not connected to the flow/pressure control device for controlling the source, wherein said second group of distributor means are not subjected to a pressure of said first group of distributor means and respective corresponding receivers are free to receive output flow from the source, pressure in these receivers comprising one member selected from the group consisting of pressure of the load and pressure corresponding to flow determined by the pressure flow equilibrium, wherein the transmission line of the second group of distributor means is connected to the flow/pressure control device for controlling the source through a preloaded non-return member, said preloaded non-return member being arranged in the transmission line and comprises said shut-off means separating the first group of distributor means and the second group of distributor means, wherein each distributor means is able to split flow depending on which group of distributor means is delivering pressure.

4. A multiple hydraulic distributor device according to claim 3 comprising at least another group of distributor means comprising preloaded non-return members arranged in the transmission line respectively between each of said first group of distributor means, said second group of distributor means, and said at least another group of said distributor means wherein only the first group of distributor means comprises a transmission line linked directly to the device for controlling the source.

* * * * *